United States Patent
Nagura et al.

[11] Patent Number: 5,670,959
[45] Date of Patent: Sep. 23, 1997

[54] ANTENNA REFLECTOR

[75] Inventors: Michinaga Nagura, Kariya; Tomohisa Kishigami, Oobu, both of Japan

[73] Assignee: Nippondenso Co., Ltd., Kariya, Japan

[21] Appl. No.: 544,764

[22] Filed: Oct. 18, 1995

[30] Foreign Application Priority Data

Oct. 19, 1994 [JP] Japan .................. 6-253894

[51] Int. Cl.$^6$ .................................................. G01S 13/75
[52] U.S. Cl. .................................................. 342/6
[58] Field of Search .................................. 342/5, 6, 7

[56] References Cited

U.S. PATENT DOCUMENTS

| | | | |
|---|---|---|---|
| 3,965,234 | 6/1976 | Lane, Jr. | 441/1 |
| 4,195,298 | 3/1980 | Firth | 342/8 |
| 4,785,301 | 11/1988 | Schafer et al. | 342/7 |
| 5,003,319 | 3/1991 | Murakami et al. | 343/700 MS |
| 5,247,305 | 9/1993 | Hirata et al. | 342/44 |
| 5,319,373 | 6/1994 | Maxwell et al. | 342/6 |

FOREIGN PATENT DOCUMENTS

| | | |
|---|---|---|
| 609 453 | 8/1994 | European Pat. Off. . |
| 50-114143 | 9/1975 | Japan . |
| 57-042871 | 3/1982 | Japan . |
| 60-173903 | 9/1985 | Japan . |
| 61-172409 | 8/1986 | Japan . |
| 62-085504 | 4/1987 | Japan . |
| 62-234434 | 10/1987 | Japan . |
| 2-065532 | 3/1990 | Japan . |
| 3-028570 | 6/1991 | Japan . |
| 4-032808 | 8/1992 | Japan . |
| 5-152833 | 6/1993 | Japan . |

*Primary Examiner*—Daniel T. Pihulic
*Attorney, Agent, or Firm*—Cushman, Darby & Cushman IP Group of Pillsbury Madison & Sutro LLP

[57] ABSTRACT

An antenna reflector, which can reflect incoming radio waves, is formed as a corner of a cube by orthogonally connecting three reflectors which can reflect incoming radio waves. The reflectors are formed from semiconductor layers, conductive sheets scattered on one surface of the semiconductor layers, insulator films formed on both sides of the semiconductor layers, conductor films provided on the opposite surface of each of the insulator films, and switching elements that are formed on the semiconductor layers and which connect the conductive sheets. As a result, if direct current voltage is applied between the resistor films, the reflectors reflect radio waves while radio waves are absorbed when no direct current voltage is applied, and thus, the reflected radio wave is modulated by the application and non-application of the direct current voltage.

30 Claims, 4 Drawing Sheets

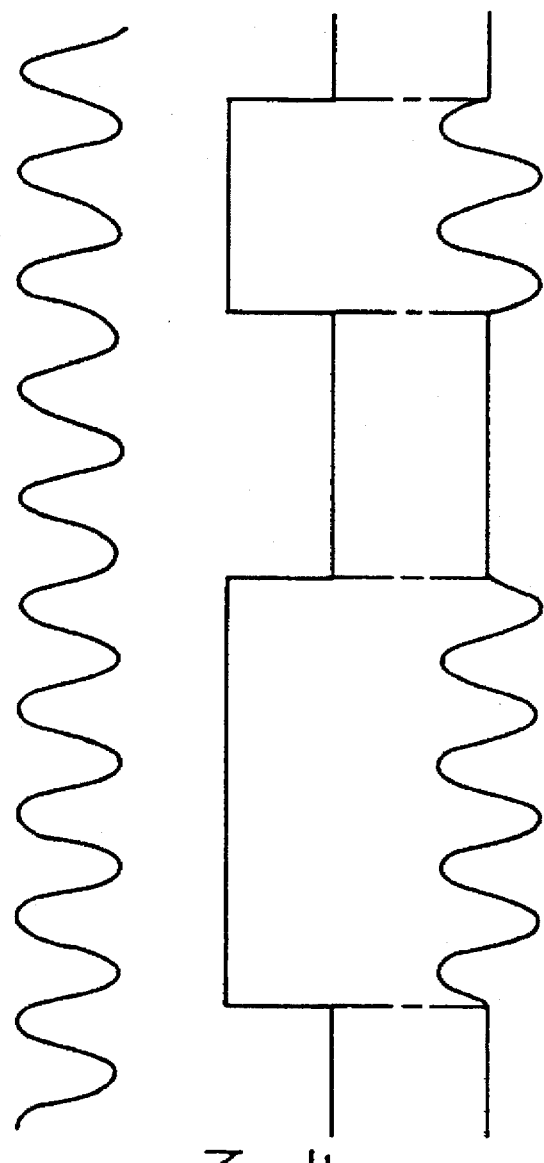
FIG. 5A  Sin
FIG. 5B  Vdc  ON / OFF
FIG. 5C  Sout

ANTENNA REFLECTOR

CROSS-REFERENCE TO RELATED APPLICATION

This application is related to and claims priority from Japanese Patent Application No. Hei-6-253894, the contents of which are hereby incorporated by reference.

BACKGROUND OF THE INVENTION

1. Field of the Invention

The present invention relates to an antenna reflector which reflects radio waves received from an outside source in an incoming direction of such radio waves.

2. Description of Related Art

Conventionally, one well-known communication device mounted on mobile bodies such as automobiles informs a ground-based station that the mobile body is approaching by sending a response signal to the ground-based station after it receives a predetermined radio wave from the ground-based station.

Moreover, in general, for this type of communication device, the use of microwaves which have relatively shorter wavelengths as the waves for transceiving enables the use of communication antennas like the small, light-weight microstrip antenna disclosed in U.S. Pat. No. 5,003,319 to Murakami et al. which can be mounted easily on moving bodies.

However, these microstrip antennas have poor directivity characteristics and since the intensity of radio waves declines in inverse proportion to the square of the distance, the intensity of the radio waves released from these microstrip antennas has to be increased to ensure that the response radio waves are sent to the ground-based stations. Thus, for this purpose, a high-frequency amplifier has to be provided inside the communication device.

SUMMARY OF THE INVENTION

In view of the foregoing problems of the prior art in mind, it is a goal of the present invention to provide a construction for responders which ensures that, after receipt of radio waves from the outside, response waves are sent without using high-frequency amplifiers to a transmission side that sent the radio waves.

To achieve this aim, one aspect of the present invention provides an antenna reflector which reflects radio waves in an incoming direction of the radio waves sent from the outside and which includes three reflectors for reflecting incoming radio waves, where the reflectors have reflecting surfaces that are sufficiently larger than the wavelength of the radio waves, wherein such reflectors are disposed to form one corner of a cube so that each of them is in perpendicular to the others.

In this way, radio waves from the outside projected to the antenna reflector are reflected by the reflecting surface of one of the reflectors at the same angle as the angle of incidence and furthermore, the reflected radio wave is reflected by the reflecting surfaces of the other reflectors. Thus, all radio waves are reflected in their incoming directions by at least a reflecting surface of one of the three reflectors.

Therefore, according to the antenna reflector of the present invention, the dispersion of reflected radio waves is prevented and the attenuation of reflected radio waves lessened. For this purpose, unlike conventional devices, there is no need to use high-frequency amplifiers or the like to amplify response signals when sending back such response signals to transmitter devices which sent the radio waves and thus, the responder can be implemented using a simple construction.

However, it must be noted here that if the reflecting surface is only slightly larger than the wavelength of the radio wave, the incoming radio wave cannot be reflected satisfactorily. Of course, this also holds true when the reflecting surface is smaller than the wavelength of the radio wave. Because of this, there is a need to enlarge the reflecting surface so it is substantially larger than the wavelength of the radio waves that are to be reflected. "Substantially", as used herein and in the appended claims, therefore means a size which is sufficiently larger than the radio wave wavelength so that the reflecting surface effectively reflects the radio wave when that surface is driven as a reflector. For example, if the reflecting surface is shaped like a square, one of its sides should have a length that is 3–5 times the wavelength of the radio wave.

In addition, with the use of this antenna reflector, while there is a lower limit to the frequency of the radio waves that can be reflected which is due to the size of the reflecting surface, since radio waves having a frequency higher (in short, radio waves that have a shorter wavelength) than that limit can be reflected, then the bandwidth of the radio waves that are sent back as response waves is much wider and thus, there is a wider variety of uses for the antenna reflector.

Another aspect of the present invention provides an antenna reflector which further includes a modulation device which modulates radio waves reflected in the direction of the incoming radio waves by changing the reflectivity of the reflecting surfaces of each of the reflectors.

Thus, for example, according to the antenna reflector of the present invention, the modulation device can be used to switch the reflectivity for the radio waves of each of the reflecting surfaces either to a very high value, which represents almost total reflection of the incoming radio wave, or a very low value, which represents almost total absorption of the incoming radio wave, based on predetermined binary data. In this way, a reflected radio wave modulated according to such binary values is transmitted to the transmission source of the radio waves. Thus, the transmission source can decode the binary data based on the receipt and non-receipt of the reflected radio wave.

In short, according to this aspect of the present invention, not only can the antenna reflector send simple reflected radio waves to the transmission device which sent the radio waves, but also, it can send data encoded based on the designated information and thus, the desired information can be transmitted to the transmission device.

A further aspect of the present invention provides an antenna reflector wherein each of the reflectors includes a pair of resistor films disposed on both sides of a semiconductor layer, a pair of insulator films which insulates each resistor film from the semiconductor layer and a switching element formed on the semiconductor layer for connecting adjacent conductive sheets which are numerous and which are formed and scattered between the semiconductor layer where the radio waves from the outside enters and the insulator film, wherein the modulation device varies the reflectivity of the reflecting surface of each reflector by varying a voltage applied to the pair of resistor films.

That is, if a voltage is applied between the resistor films of the reflector of the present invention, the switching element is actuated in accordance with the voltage applied, each of the conductive sheets connect to form one conductive sheet and thus, radio waves are reflected. On the other hand, if the voltage between the resistor films is set to zero, the switching element is turned off, the conductive elements are insulated from each other and thus, radio waves are not reflected.

In this way, for the present invention, the reflected radio waves are modulated by a change in the reflection rate for the radio waves of each of the reflectors effected by adjusting the voltage applied between the resistor films. For this purpose, according to the present invention, the reflected radio wave can be modulated easily by the voltage applied between the resistor films by the modulation device and thus, the desired information can be sent easily to the transmission device which sent the original radio wave.

Through thin-film technology, it must be noted here that these reflectors which include semiconductor layers, resistor films, insulator films, conductive sheets and switching elements can be manufactured using almost the same process used in manufacturing semiconductors.

An additional aspect of the present invention is an antenna reflector having reflectors that include thin-film switching elements formed on top of the insulator film for connecting adjacent conductive sheets which are numerous and which are formed and scattered on top of the insulator film, and a resistor film for applying voltage to the gates of the thin-film switching elements, wherein the modulation device varies the reflection rates for the radio waves of the reflecting surfaces of each reflector by varying the voltage applied to the resistor films.

In this way, this aspect replaces the semiconductor layer used in the previous aspect in forming the reflectors of the antenna reflector with an insulator sheet. Similar to the effects of the previous aspect, the reflected radio waves can be modulated easily in this aspect by applying a voltage via the resistor films to the thin-film switching elements. It must be noted here that the switching elements can be formed easily by forming the semiconductor layer through epitaxial growth.

A yet further aspect of the present invention provides a reflector antenna which is a moving-body reflector antenna mounted on a moving body, and which receives millimeter waves sent by a ground-based station and returns response waves to the ground-based station.

That is, if the antenna reflector, as described in the previous aspects, is to be used as a moving body antenna, then it should be several meters in size because the wavelength is on the order of tens of centimeters if the ground-based station sends microwaves on the order of a number of gigahertz. Thus, it will be difficult to mount antennas of this size on vehicles. Therefore, if the antenna is to be used as a moving body antenna, the radio waves used for communication with the ground-based station should be milliwaves (30–300 GHz) which have short wavelengths. Thus, with reflectors having a size of a few centimeters to a few decimeters, mounting the antenna on moving bodies such as automobiles or the like is easy.

Thus, the antenna reflector of this aspect of the present invention can be set to an appropriate size as a moving body antenna and it can be installed easily on moving bodies.

Moreover, since these antenna reflectors mounted on moving bodies simply reflect radio waves from the outside and do not emit radio waves on their own, there is no need to apply for a wireless station permit as required by regulations. Thus, the antenna reflector is used as a simple transponder.

Also, since these antenna reflectors do not emit radio waves on their own, these devices will not affect radio receivers or the like installed in the moving bodies and other communication devices surrounding the moving bodies.

BRIEF DESCRIPTION OF THE DRAWINGS

Additional objects and advantages of the present invention will be more readily apparent from the following detailed description of the preferred embodiments thereof when taken together with the accompanying drawings in which:

FIGS. 5A–5C are explanatory diagrams showing changes in the reflected radio wave during the application/non-application of direct current voltage to the reflector.

DETAILED DESCRIPTION OF PRESENTLY PREFERRED EXEMPLARY EMBODIMENTS

Preferred embodiments of the present invention are hereinafter described with reference to the accompanying drawings.

Figure 1:
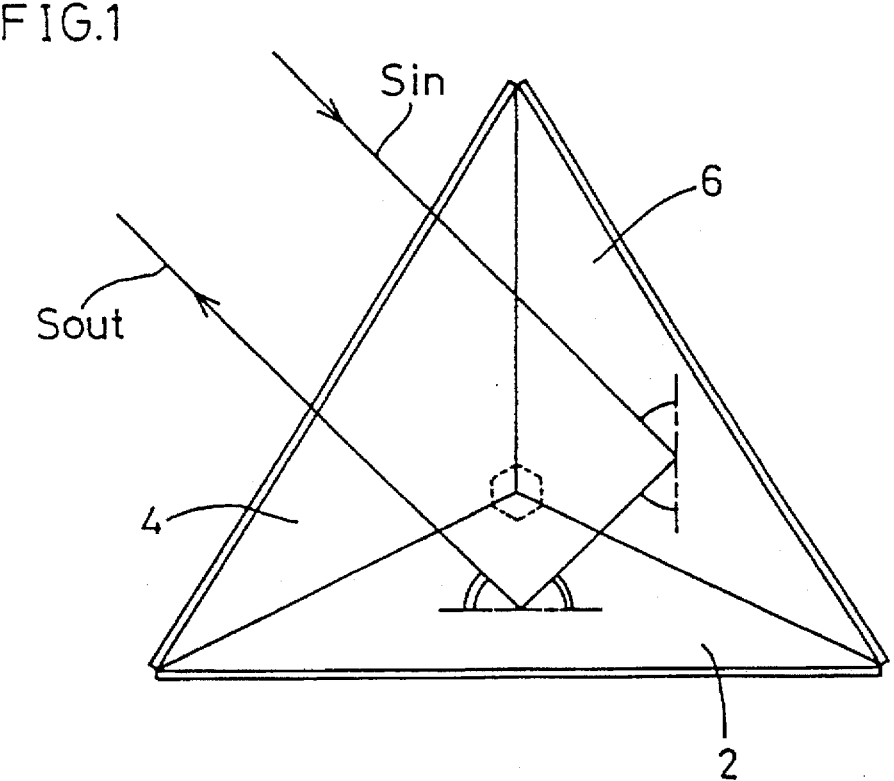
FIG. 1 is a schematic diagram showing the entire construction of an antenna reflector according to a first embodiment of the present invention.

FIG. 1 is a schematic diagram showing the entire construction of an antenna reflector according to the present invention.

It must be noted here that in a preferred embodiment, the antenna reflector of the present invention is mounted on an automobile and is formed as a responder of a commonly-known toll charge system wherein such transponder receives 60 GHz milliwaves sent by ground-based stations installed in the entrance and departure gates when the vehicle enters or leaves toll roads or toll parking lots, and sends response waves that include its own identification code to enable toll charging of toll charges and parking fees in the ground-based station side.

As shown in FIG. 1, the antenna reflector of the present embodiment is formed from three reflectors 2, 4, 6 which can reflect an incoming radio wave Sin. The reflectors 2, 4, 6 are shaped as a congruent isosceles right triangle with their right angle apexes being joined to form a corner of a cube drawn in dotted lines in FIG. 1 so that the reflectors 2, 4, 6 are orthogonal with each other.

To ensure that the 60 GHz milliwaves sent by the ground-based station are received by each of the reflectors 2, 4, 6, the length of the base of each reflector 2, 4, 6 is set at approximately 2.8 cm with the length of the other sides set at approximately 2 cm.

For this purpose, with the reflecting surfaces of each of the reflectors 2, 4, 6 formed using conductive sheets for the antenna reflector of the present embodiment, when an incoming radio wave Sin sent from the outside hits reflector 6, for example, incoming radio wave Sin is reflected by the reflecting surface of reflector 6 at an angle equal to the angle of incidence of incoming radio wave Sin. Furthermore, the reflected radio wave strikes reflector 4 with reflector 4 reflecting the radio wave at its incoming direction. In this way, incoming radio wave Sin is reflected 1–3 times by reflectors 2, 4, 6 with reflected radio wave Sout being reflected in the incoming direction of incoming radio wave Sin.

Figure 2A:
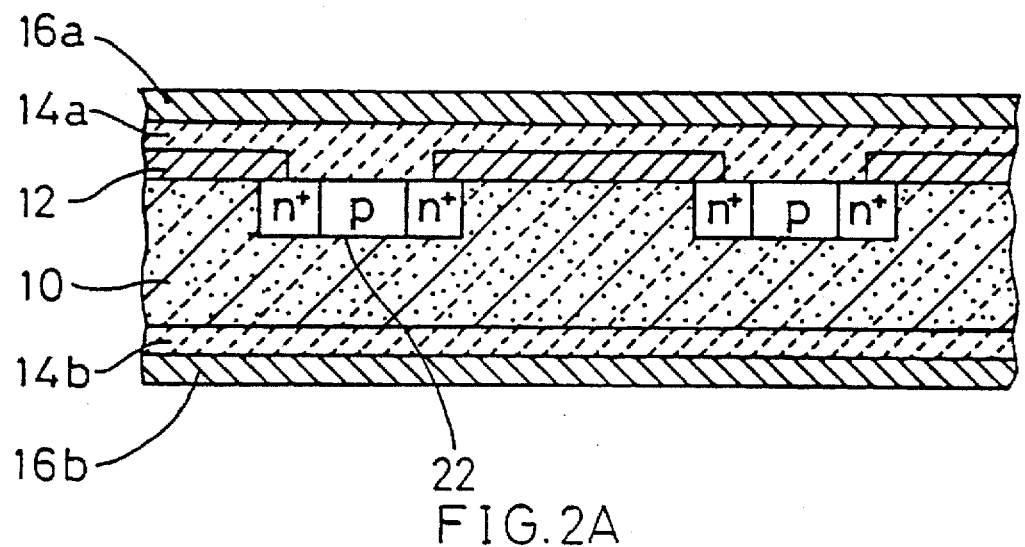
FIG. 2A is a cross-sectional view and FIG. 2B is a plan view of the structure of the reflector which forms the antenna reflector of the first embodiment.

On the other hand, as shown in FIG. 2A, each of the above reflectors 2, 4, 6 is composed of a semiconductor layer 10, conductive sheets 12 scattered and provided on one surface of the semiconductor layer 10, a pair of insulator films 14a, 14b formed at opposite faces of the semiconductor layer 10, and resistor films 16a, 16b provided on the surface of respective insulator films 14a, 14b.

The semiconductor layer 10 forms a switching element (an N-channel MOSFET in the present embodiment), which is for connecting the conductive sheets 12, in the Si (silicon) layer 10 using a well-known method such as ion implantation or the like. The conductive sheets 12 form a conductive film on one surface of the semiconductor layer 10. Furthermore, by removing unnecessary parts through photo-etching, the conductive sheets 12 are distributed at substantially the same interval on one surface of the semiconductor layer 10 and using well-known thin-film technology, insulator films 14a, 14b and resistor films 16a, 16b are formed on both surfaces of the semiconductor layer 10.

It must be noted here that among the pair of insulator films 14a, 14b, the insulator film 14a provided on the surface of the semiconductor layer 10 that has conductive sheets 12 is the one formed on the semiconductor layer 10 to cover conductive sheets 12.

Figure 2B:
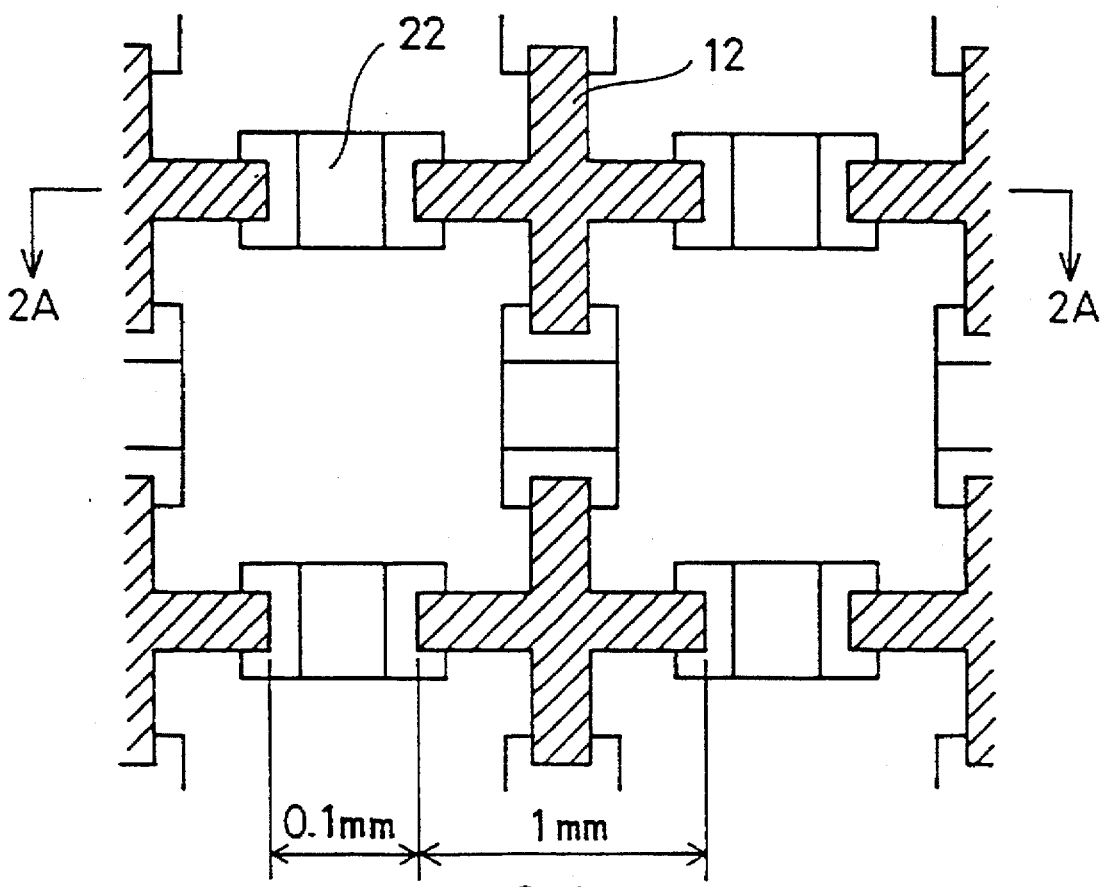

Moreover, as shown in FIG. 2B, each of conductive sheets 12 is shaped like a cross with the length of one branch of the cross set to be sufficiently smaller than the wavelength of the incoming radio wave Sin, i.e., at around 1 mm, so that each branch does not directly reflect the incoming radio wave. These crosses are set on one surface of the semiconductor layer 10 so that a space of approximately 0.1 mm is provided between branches of different crosses.

For the reflectors 2, 4, 6 constructed like this, the switching element 22 is at an OFF-state, which is the normal state, when voltage from the outside is not applied and thus, conductive sheets 12 are electrically disconnected.

Figure 3A:
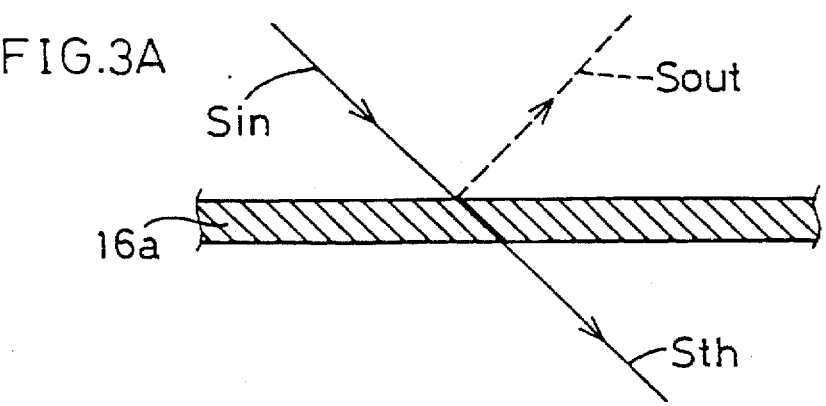
FIGS. 3A and 3B are explanatory diagrams showing the reflection and the absorption state of the incoming radio wave Sin in resistor films and conductive sheets which form the reflector of the first embodiment.

Also, because the resistor films 16a, 16b are film resistors which have high impedances and are thin, then as shown in FIG. 3A, incoming radio wave Sin has no reflection, i.e., reflected radio wave Sout. Instead, incoming radio wave Sin is absorbed almost entirely as absorbed radio wave Sth.

Figure 3B:
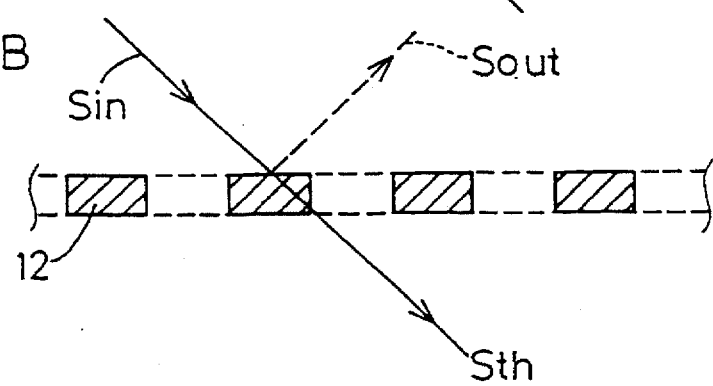

In addition, because conductive sheets 12 are sufficiently smaller compared to the wavelength of the incoming radio wave Sin, then as shown in FIG. 3B which shows the semiconductor layer 10 in its regular state as an insulator, incoming radio wave Sin is not reflected as reflected radio wave Sout. Instead, incoming radio wave Sin is absorbed almost entirely as absorbed radio wave Sth.

Therefore, normally, each of above reflectors 2, 4, 6 are absorbent sheets which absorb incoming radio wave Sin as is and thus, there is no reflected radio wave Sout for incoming radio wave Sin.

Figure 4:
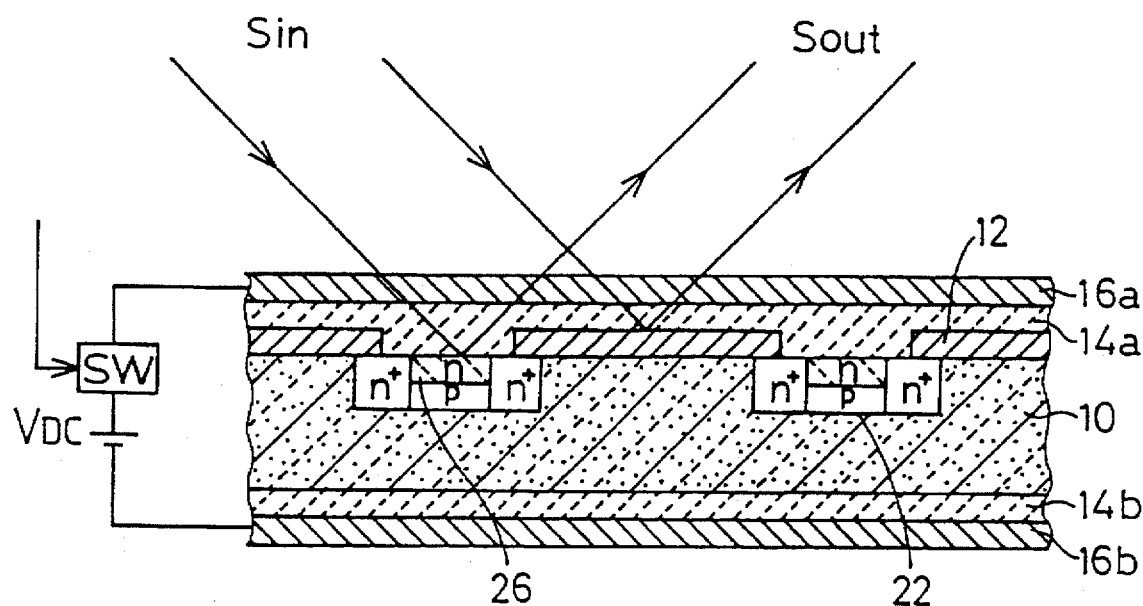
FIG. 4 is an explanatory diagram showing a structural change in the semiconductor layer when direct current voltage is applied to the reflector and the reflected state of the incoming radio wave Sin.

On the other hand, as shown in FIG. 4, with the actuation of a switching element (voltage application switch) SW which is formed from transistors as will be apparent to those skilled in the art, the application of direct current voltage VDC between resistor films 16a–16b for making the voltage of the resistor film 16a side positive actuates the switching element 22 and connects each of the conductive sheets 12.

If each of the conductive sheets 12 are connected, then when radio wave Sin strikes the conductive sheet 12 side, switching element 22 turns into an inversion layer and thus, the incoming radio wave Sin is almost entirely reflected.

Accordingly, the conductive sheet 12 sides of the reflectors 2, 4, 6 of the antenna reflector of the present embodiment are shaped to become the inner sides of the corner of a cube by connecting each of the reflectors 2, 4, 6 to be orthogonal to each other. Furthermore, by providing a direct current electric power supply source and a voltage application switch SW between resistor films 16a–16b of each of the reflectors which results in the provision of positive voltage to the resistor film side 16a that is provided with the conductive sheets 12, the switch SW can be made to switch on and off using a modulation code set in accordance with a predetermined identification code, and each of the reflectors 2, 4, 6 can be switched to reflect or absorb the incoming radio wave Sin.

In short, as shown in FIG. 4, the antenna reflector of the present embodiment applies direct-current voltage VDC between resistor films 16a–16b of each of the reflectors 2, 4, 6 and provides a voltage application switch SW as the modulation device for adjusting the reflection rates of each of the reflectors 2, 4, 6. As shown in FIGS. 5A–5C, by turning this switch SW on and off in accordance with the modulation signal which corresponds to the identification code, the output and non-output of the reflected radio wave Sout can be controlled and so, the antenna reflector of the present embodiment sends backs codes to the ground-based station which sent the incoming radio wave Sin to inform the station of the approach of the vehicle or the identification code of the vehicle installed with the antenna reflector.

In this way, the three reflectors 2, 4, 6 of the antenna reflector of the present embodiment joined together to form a corner of a cube are constructed to function either as reflectors for reflecting radio waves or as absorbers for absorbing radio waves in accordance with the application/non-application of the direct current voltage VDC.

Therefore, when direct current voltage VDC is applied to each of the reflectors 2, 4, 6, the incoming radio wave Sin sent by the ground-based station is reflected back to it with virtually no losses and thus, the antenna reflector can inform the ground-based station of the approach of the vehicle equipped with the antenna reflector.

In addition, by turning the voltage application switch SW on and off in correspondence with the identification code during the approach of the vehicle to the ground-based station, a modulated reflection radio wave Sin can be sent to the ground-based station. For this purpose, the ground-based station side can derive information on the owner of the vehicle that is approaching and on toll charges and thus, toll charge operations are done promptly and accurately.

Furthermore, because the antenna reflector of the present invention performs transmission and receipt operations of milliwaves with the ground-based station, its size can be adjusted so that it can be mounted on vehicles and so, the antenna reflector does not represent an obstruction to the vehicle to which it is installed in.

Moreover, because each of reflectors 2, 4, 6 are formed by forming the insulator films 14a, 14b, the resistor films 16a, 16b and the like as thin films in the semiconductor layer 10, they can be manufactured easily using semiconductor manufacturing technology. In addition, because reflectors 2, 4, 6 have thin films and are light weight, their installation in vehicles and transportation can be done efficiently.

Figure 6:
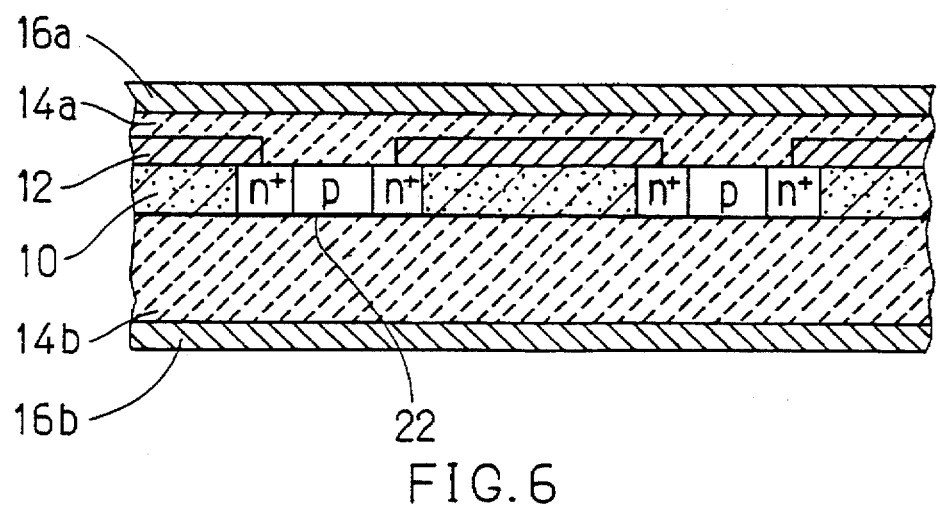
FIG. 6 is a cross-sectional view of an antenna reflector according to a second preferred embodiment of the present invention.

While the switching element 22 has been formed on top of the semiconductor layer 10 in the present embodiment, switching elements provided in the semiconductor layer 10, which has been formed on the insulator using epitaxial growth, can be used in connecting the conductive sheets 12 as shown in FIG. 6, and in doing so, the same effects can be achieved.

Also, while an N-channel MOSFET is used as the switching element for the present embodiment, the same effect can also be achieved by using a P-channel MOSFET while also reversing the polarities of the voltages applied to the resistor films 16a, 16b. In addition, structures other than the MOSFET can be used as the switching element 22 as long as the connection and the disengagement of the conductive sheets 12 can be controlled. Furthermore, frequency characteristics can be improved by using Ga-As compound semiconductors.

Moreover, while the antenna reflector is installed in vehicles and is used as a responder to ground-based stations in the present embodiment, this antenna reflector can also be used for other purposes since it can reflect incoming radio wave Sin as is in the incoming direction.

For example, this antenna reflector can be installed as a ground-based station which receives radio waves reflected from predetermined radio waves sent by moving bodies and thus, the antenna reflector can be used by the moving body in a position detection system which detects the position of the moving body relative to the ground-based station.

Moreover, for this case when the antenna reflector is to be used as a ground-based station, the antenna reflector can be enlarged to transmit and receive microwaves since there is no need to reduce the size of the antenna like the case when they are to be installed in vehicles. In addition, while it is difficult to use semiconductor technology for the modulation of the reflected radio wave Sout for this case, the reflecting surface of the reflector can be divided into many divisions, and by mechanically adjusting the angles of the subdivided reflecting surface, the reflection rate for the radio wave of the entire reflector can be adjusted and thus, modulation of the reflected radio wave Sout is also possible.

Furthermore, during the modulation of the reflected radio wave Sout, there is no need to always adjust the reflectivity for the radio waves of the reflecting surfaces. Instead, a material whose absorption or penetration characteristics are adjustable can be provided in the front surface of the reflecting surface and thus, modulation of the reflected radio wave can be achieved by electrically adjusting the absorption or penetration characteristics of such material.

Although the present invention has been fully described in connection with preferred embodiments thereof, it is to be noted that various changes and modifications will becomes apparent to those skilled in the art. Such changes and modifications are to be understood as being within the scope of the present invention as defined by the appended claims.

What is claimed is:

1. An antenna reflector which reflects radio waves sent by a source external to said antenna in an incoming direction of said radio waves, said antenna reflector comprising:

three reflectors which reflect incoming radio waves and which have reflecting surfaces that are substantially larger than a wavelength of said radio waves;

wherein said reflectors are joined in a shape of a corner of a cube so that each of said reflectors is perpendicular to each other reflector; and each of said reflectors includes a semiconductor switching element having a first state in which said semiconductor switching element is transmissive to said radio waves and a second state in which said semiconductor switching element includes an inversion layer which reflects said radio waves.

2. The antenna reflector of claim 1, further comprising modulation means for modulating reflected radio waves by changing reflectivities of the reflecting surfaces of each of said reflectors.

3. An antenna reflector which reflects radio waves sent by a source external to said antenna in an incoming direction of said radio waves, said antenna reflector comprising:

three reflectors which reflect incoming radio waves and which have reflecting surfaces that are substantially larger than a wavelength of said radio waves;

wherein said reflectors are joined in a shape of a corner of a cube so that each of said reflectors is perpendicular to each other reflector;

each of said reflectors including
 a) a semiconductor layer,
 b) a plurality of conductive sheets disposed on a first side of said semiconductor layer,
 c) a plurality of switching elements in said semiconductor layer, each of said plurality of switching elements being electrically connected to at least two of said plurality of conductive sheets,
 d) a first insulator film covering said plurality of conductive sheets and said plurality of switching elements,
 e) a second insulator film disposed on a second side of said semiconductor layer opposite said plurality of conductive sheets,
 f) a first resistor film disposed on a side of said first insulator film opposite said plurality of conductive sheets and said plurality of switching elements, and
 g) a second resistor film disposed on a side of said second insulator film opposite said second side of said semiconductor layer; and said antenna further comprises modulation means is for varying said reflectivities of said reflecting surfaces by varying a voltage applied to said first and second resistor films.

4. The antenna reflector of claim 3, wherein groups of said plurality of conductive films are disposed along mutually perpendicular axes to form a cross pattern, said switching elements being disposed at intersections of said mutually perpendicular axes.

5. The antenna reflector of claim 4, wherein each of said plurality of conductive sheets has a length smaller than a wavelength of said radio waves to avoid individually reflecting said radio waves from said antenna reflector.

6. An antenna reflector which reflects radio waves sent by a source external to said antenna in an incoming direction of said radio waves, said antenna reflector comprising:

three reflectors which reflect incoming radio waves and which have reflecting surfaces that are substantially larger than a wavelength of said radio waves;

wherein said reflectors are joined in a shape of a corner of a cube so that each of said reflectors is perpendicular to each other reflector;

each of said reflectors including
 a) an insulator layer,
 b) a semiconductor layer disposed on a first surface of said insulator layer,
 c) a plurality of conductive sheets disposed on a side of said semiconductor layer opposite said insulator layer, d) a plurality of thin-film switching elements formed in said semiconductor layer, each of said plurality of switching elements being electrically connected to at least two of said plurality of conductive sheets, e) an insulator film covering said plurality of conductive sheets and said plurality of switching elements, f) a first resistor film disposed on a side of said insulator film opposite said plurality of conductive sheets and said plurality of switching elements, and g) a second resistor film disposed on a side of said insulator layer opposite said semiconductor layer; and said antenna further comprises modulation means for varying reflectivities of said reflecting surface by varying a voltage applied to said first and second resistor films.

7. The antenna reflector of claim 6, wherein sides of said switching elements opposite said insulator film contact said insulator layer.

8. The antenna reflector of claim 6, wherein groups of said plurality of conductive films are disposed along mutually perpendicular axes to form a cross pattern, said switching elements being disposed at intersections of said mutually perpendicular axes.

9. The antenna reflector of claim 6, wherein each of said plurality of conductive sheets has a length smaller than a wavelength of said radio waves to avoid individually reflecting said radio waves from said antenna reflector.

10. The antenna reflector of claim 1, wherein said antenna reflector is capable of being mounted on a moving body and is further capable of receiving millimeter waves sent by a ground-based station and returning response waves to said ground-based station.

11. An antenna reflector unit comprising an antenna reflector including:

a substrate;

a plurality of conductive films disposed on said substrate;

a plurality of switching elements each disposed between and electrically connected to at least two adjacent conductive films in said plurality of conductive films;

wherein said plurality of switching elements are each for establishing an electrical connection between said at least two adjacent conductive films, thereby causing said plurality of conductive films to form a surface which reflects radio waves.

12. The antenna reflector unit of claim 11, further comprising a plurality of said antenna reflectors.

13. The antenna reflector unit of claim 12, wherein said plurality of antenna reflectors are disposed relative to one another according to a corner of a polyhedron.

14. The antenna reflector unit of claim 13, wherein said plurality of antenna reflectors consists of three antenna reflectors.

15. The antenna reflector unit of claim 14, wherein said polyhedron is a cube.

16. The antenna reflector unit of claim 11, wherein said substrate comprises:

a first insulator layer;

a semiconductor layer disposed on a first side of said first insulator layer, said plurality of switching elements being disposed in said semiconductor layer and said plurality of conductive films being disposed on a surface of said semiconductor layer opposite said first insulator layer;

a second insulator layer disposed on a side of said conductive films opposite said semiconductor layer; and first and second resistor layers disposed on a side of said first and second insulator layers opposite said first semiconductor layer and said conductive films, respectively.

17. The antenna reflector unit of claim 16, wherein a side of said switching elements opposite said second insulator layer contacts said first insulator layer.

18. The antenna reflector unit of claim 17, wherein groups of said plurality of conductive films are disposed along mutually perpendicular axes to form a cross pattern, said switching elements being disposed at intersections of said mutually perpendicular axes.

19. The antenna reflector unit of claim 18, wherein each of said plurality of conductive sheets has a length smaller than a wavelength of said radio waves to avoid individually reflecting said radio waves from said antenna reflector.

20. The antenna reflector of claim 2, wherein said modulation means is further for changing said reflectivities by varying a voltage applied to said reflectors.

21. The antenna reflector of claim 1, wherein said incoming radio wave is absorbed through said switching element when said switching element is in an OFF-state, and reflected by said switching element when said switching element is in an ON-state.

22. The antenna reflector of claim 1, wherein said antenna reflector is used for an antenna in a responder of an automatic toll charging system.

23. The antenna reflector of claim 1, wherein said reflector is for returning an identification code on said radio waves by reflecting said radio waves in said incoming direction of said radio waves.

24. The antenna reflector of claim 3, further comprising:

modulation means for modulating reflected radio waves by changing reflectivities of the reflecting surfaces of each of said reflectors by varying a voltage applied to said reflectors;

wherein said reflectivity becomes larger when an absolute value of said voltage applied to said reflectors becomes larger.

25. The antenna reflector of claim 3, wherein said incoming radio wave is absorbed through said semiconductor layer and switching elements when said switching element are in an OFF-state, and reflected by said semiconductor layer when said switching elements are in an ON-state.

26. The antenna reflector of claim 3, wherein said semiconductor layer is gallium arsenide.

27. The antenna reflector of claim 3, wherein said switching elements are MOSFETs.

28. The antenna reflector of claim 3, wherein each of the conductive films has a cross shape.

29. The antenna reflector of claim 3, wherein said switching elements are for turning ON and OFF according to a modulated signal corresponding to a predetermined identification code.

30. An antenna reflector which reflects radio waves sent by a source external to said antenna in an incoming direction of said radio waves, said antenna reflector comprising:

three reflectors which reflect incoming radio waves and which have reflecting surfaces that are substantially larger than a wavelength of said radio waves;

wherein said reflectors are joined in a shape of a corner of a cube so that each of said reflectors is perpendicular to each other reflector; and a member which is disposed on a front surface of said reflectors and is for changing a transmissivity of said radio waves therethrough.

* * * * *